United States Patent
Li et al.

(10) Patent No.: US 10,084,362 B2
(45) Date of Patent: Sep. 25, 2018

(54) SERVOMOTOR AND CONTROL METHOD THEREOF

(71) Applicant: UBTECH Robotics Corp., Shenzhen (CN)

(72) Inventors: Youpeng Li, Shenzen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/296,064

(22) Filed: Oct. 18, 2016

(65) Prior Publication Data

US 2018/0034348 A1 Feb. 1, 2018

(30) Foreign Application Priority Data

Jul. 30, 2016 (CN) .......................... 2016 1 0615912

(51) Int. Cl.

| | |
|---|---|
| H02K 11/30 | (2016.01) |
| H02K 7/116 | (2006.01) |
| F16H 49/00 | (2006.01) |
| F16H 1/06 | (2006.01) |

(52) U.S. Cl.
CPC ........... *H02K 11/30* (2016.01); *F16H 49/001* (2013.01); *H02K 7/116* (2013.01); *F16H 1/06* (2013.01)

(58) Field of Classification Search
CPC .............................. F16H 49/001; H02K 7/116
See application file for complete search history.

(56) References Cited

U.S. PATENT DOCUMENTS

| | | | | |
|---|---|---|---|---|
| 4,945,293 A | * | 7/1990 | Wittkopf ................. | B41F 13/02 318/12 |
| 2007/0209861 A1 | * | 9/2007 | Kruttschnitt ........... | B62D 5/008 180/444 |
| 2015/0184700 A1 | * | 7/2015 | Balsiger ................ | F16H 49/001 74/405 |

FOREIGN PATENT DOCUMENTS

| | | |
|---|---|---|
| CN | 103481293 A | 1/2014 |
| JP | 4581543 | 2/2006 |
| JP | 2006-271189 | 10/2006 |
| JP | 4581543 B2 | 11/2010 |
| JP | 5659446 | 10/2013 |

* cited by examiner

Primary Examiner — Muhammad S Islam

(57) ABSTRACT

A servomotor includes a control circuit, an electric motor, a harmonic drive and a sensor. The control circuit is connected to the electric motor and used to control the electric motor. The harmonic drive includes an outer casing, a wave generator, a flex spline and a circular spline. The wave generator is driven by the electric motor. The flex spline is sleeved on an exterior of the wave generator and located within the circular spline and engages with the circular spline. The flex spline is connected with an output member that is used to output power, and a post is arranged along a rotation axis of the output member. The sensor is arranged within the outer casing and used to detect an angular displacement of the post. A method for controlling the servomotor is also provided.

13 Claims, 4 Drawing Sheets

SERVOMOTOR AND CONTROL METHOD THEREOF

CROSS REFERENCE TO RELATED APPLICATIONS

This application claims priority to Chinese Patent Application No. 201610615912.9, filed Jul. 30, 2016, which is hereby incorporated by reference herein as if set forth in its entirety.

BACKGROUND

1. Technical Field

The present disclosure generally relates to motor speed-reduction transmission technology, and particularly to a servomotor and a control method thereof.

2. Description of Related Art

Servomotors are automatic control systems that include a DC motor, a speed reduction gear set, a sensor, and a control circuit. The existing speed reduction gear sets for servomotors are mainly spur gear reducers and some of them are planetary gear reducers. Because of performance needs, the reduction ratio of servomotors is usually 1/200, and can even be 1/300. It usually needs three to five stages of speed reduction for the spur gear reducers and the planetary gear reducers to obtain the above-mentioned reduction ratio. It usually needs four stages of speed reduction for obtaining the reduction ratio. Considering the actual machining and assembling capability, given that the total efficiency of a single stage gear set is about 90-95%, then the total efficiency of four stage gear set is about 65.6-81.5%. When there is improper design/assembling, the efficiency will be lower, resulting in that the gear sets to have a large size and low efficiency. For a smooth transmission, the gears of the spur gear reducers and the planetary gear reducers are arranged to have gaps, resulting in that reducers to theoretically have backlash. The unit for measuring the backlash is arcmin (arc minute). Generally, reducers having a backlash smaller than 3 archmins are called high precision type, and reducers having a backlash greater than 15 archmins are called low precision type. The backlash of ordinary planetary gear reducers can be 15-3 archmins, and the backlash of ordinary spur gear reducers is greater than 15 archmins.

Another type of reduces, the harmonic gear reducers, are new type of reducers that are developed based on the principle of planetary gear transmission. The harmonic gear transmissions are a type of planetary gear transmission that transmits power and motion through the mechanical wave generated by flexible components. The harmonic drives have been widely used as important components of robot joints for the advantages of simple structure, small size, low noise, high transmission ratio, high transmission precision, and high efficiency. Harmonic drives have been fully studied by main industrialized countries all over the world since the first harmonic drive was invented by the American C. W. Musser in 1955. Various types of harmonic drives with different sizes have been developed, among which harmonic fine-pitch gear reducers are most widely used. Since the limitations in structure and technology exist, when the existing harmonic drives are used, the position of the output side is usually controlled by the detection value of the encoder at the back of the motors. Because the motor output error and the harmonic transmission error are not considered, the error generated during the transmission process can not be eliminated, causing the backlash error of the output side to be uncontrollable. The backlash of the harmonic drives is usually less than 1 arcmin, and the backlash of some high precision harmonic drives is less than ⅓ arcmin. After the harmonic drive is used, the gears may be worn, causing the backlash to increase.

Angular transmission accuracy or angular transmission error, refers to the difference between the theoretical output rotation angle and the actual output rotation angle. The above-mentioned backlash, motor output and harmonic transmission error will affect the motor output angle and lower the angular transmission accuracy of motor.

SUMMARY

A servomotor includes a control circuit, an electric motor, a harmonic drive and a sensor. The control circuit is connected to the electric motor, and used to output signals to control the electric motor. The harmonic drive includes an outer casing, a wave generator, a flex spline and a circular spline that are arranged within the outer casing. The electric motor is arranged at one end of the outer casing. The wave generator is driven by the electric motor. The flex spline is sleeved on an exterior of the wave generator. The circular spline is fixed within the outer casing. The flex spline is located within the circular spline and engages with the circular spline. The flex spline is connected with an output member that is used to output power, and a post is arranged along a rotation axis of the output member. The sensor is arranged within the outer casing and used to detect an angular displacement of the post.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
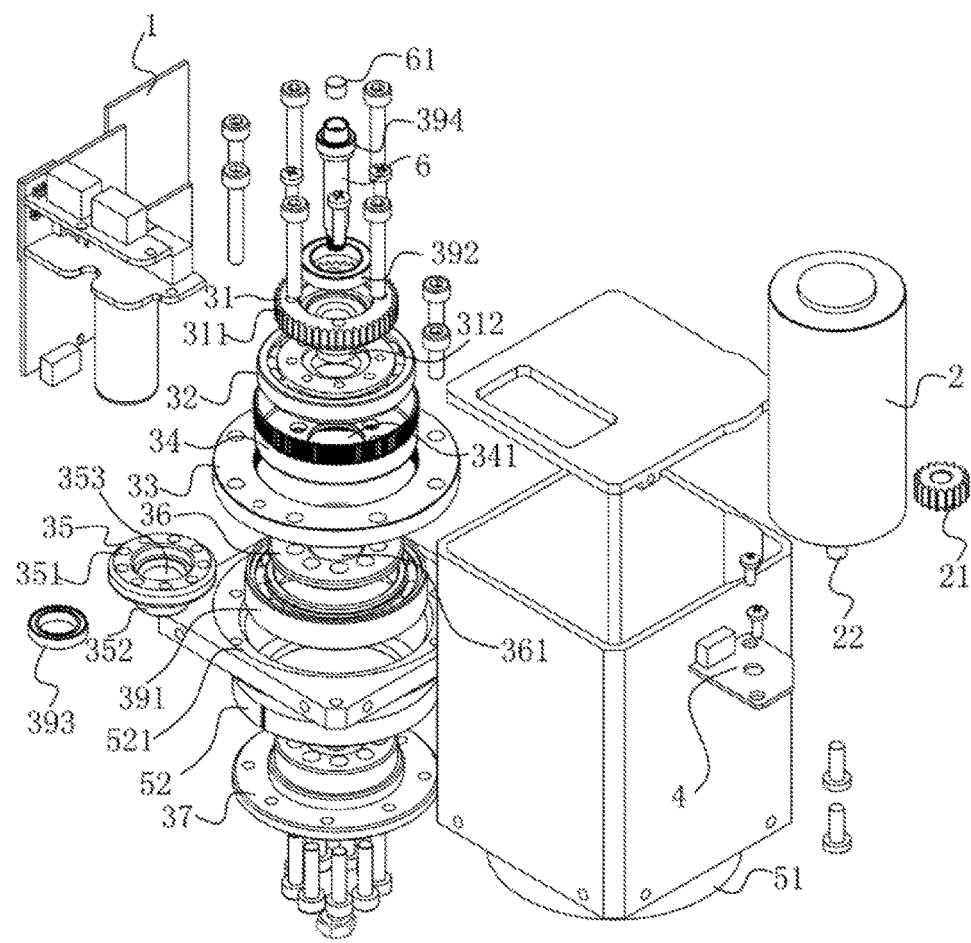
FIG. 1 is an isometric exploded view of a servomotor according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Embodiment 1

Figure 2:
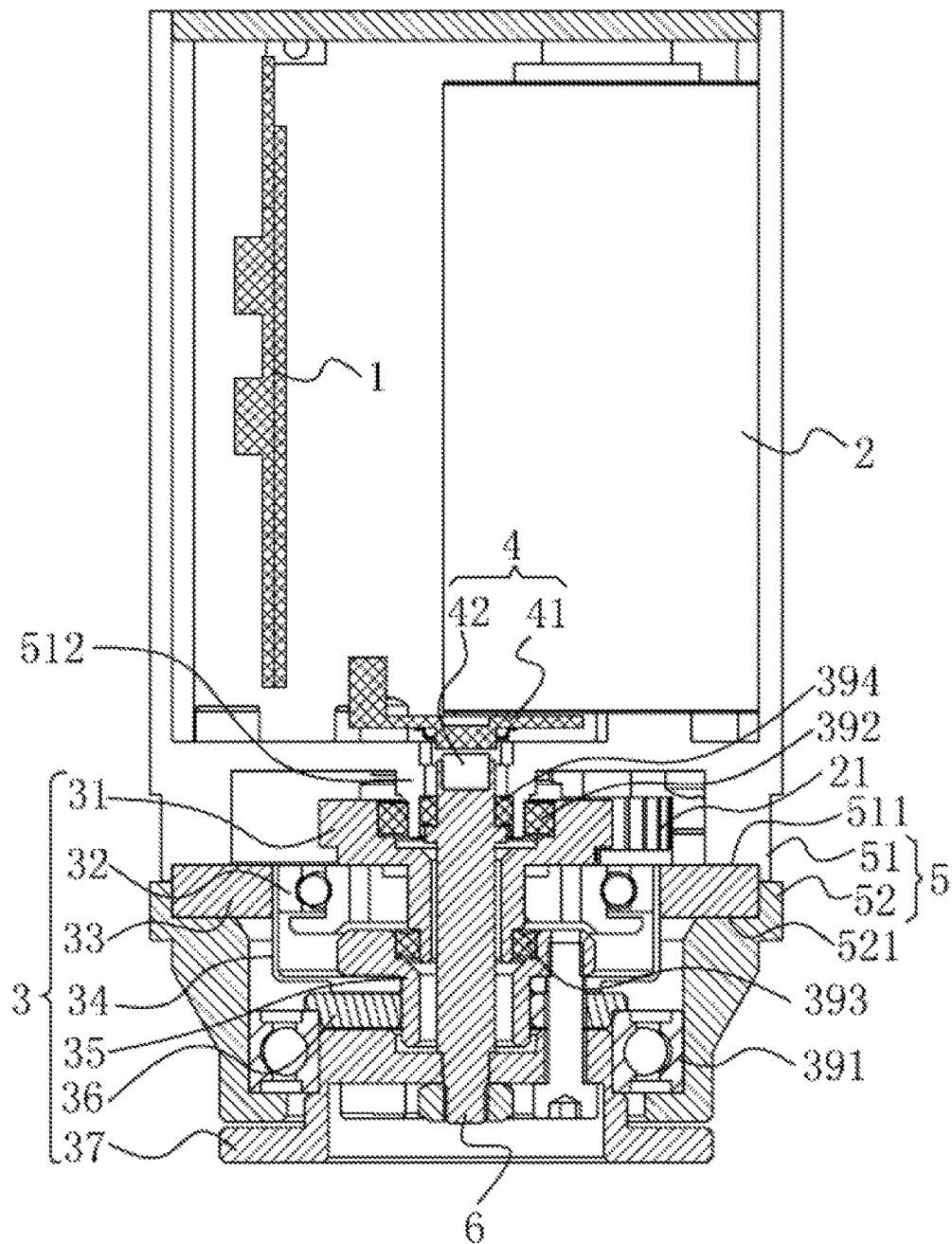
FIG. 2 is a cross-sectional view of the servomotor of FIG. 1.

Referring to FIGS. 1 and 2, in the present embodiment, a servomotor includes a control circuit 1, an electric motor 2, a harmonic drive 3, and a sensor. The control circuit 1 is electrically connected to the electric motor 2, and used to control the angular displacement, rotational speed, and torque of the electric motor 2.

The harmonic drive 3 includes an outer casing 5, a wave generator 32, a flex spline 34 and a circular spline 33 that are arranged within the outer casing 5. The wave generator 32 is a cam having varying radial length, and includes a rolling bearing mounted on its periphery. The electric motor 2 is arranged at one end of the outer casing 5. The wave generator 32 is driven by the electric motor 2. The flex spline 34 is sleeved on an exterior of the wave generator 32. Controllable deformation of the flex spline 34 can be generated by the wave generator 32. The circular spline 33 is fixed within the outer casing 5. An outer gear is arranged on an exterior of the flex spline 34. The circular spline 33 is a ring shaped internal gear, and the flex spline 34 is located within the circular spline 33 and engages with the circular spline 33. When the wave generator 32 rotates, the shape of the flex spline 34 keeps changing, thereby promoting the engaging state between the flex spline 34 and the circular spline 33 and realizing the reverse rotation of the flex spline 34 relative to the circular spline 33 along the wave generator 32.

Transmission ratio is controlled by the difference between the teeth of the flex spline 34 and the circular spline 33, and the gear teeth of the flex spline 34 of the wave generator 32 move radially and evenly during the transmission process. Therefore, the relative sliding speed of gear teeth is low even if the input speed is high. The wear of gear teeth is thus mild and the efficiency is high and can be up to 69-96%. Compared with conventional reducers, when realizing the same output torque, the size of the harmonic drive can be reduced by ⅔ and the weight can be reduced by ½, allowing the servomotor to be small-sized and light-weighted.

The flex spline 34 is connected with an output member 37 that is used to output power, and a post 6 is arranged along a rotation axis of the output member 37. The sensor is arranged within the outer casing 5 and used to detect angular displacement of the post 6.

In the embodiment, the electric motor 2 includes an output shaft 22, and one end of the output shaft 22 extends to an inside of the outer casing 5 and includes a first gear 21 arranged thereto. The wave generator 32 includes a second gear 31 arranged thereto. The first gear 21 engages with the second gear 31 for a first stage transmission. The electric motor 2 outputs torque via the output shaft 22. The torque is then transmitted to the wave generator 32 via the first gear 21 and the second gear 31, realizing the torque input to the harmonic drive 3, and the speed-reduction transmission output through the harmonic drive 3.

The first gear 21 and the second gear 31 are spur gears, and the number of the teeth of the first gear 21 is less than the number of the teeth of the second gear 31. The first gear 21 and the second gear 31 form a spur gear speed-reduction transmission. It is noteworthy that the spur gear speed-reduction transmission is just one preferred embodiment. Other gear transmission technologies used as alternative technical solutions, such as bevel gear transmission and leadscrew transmission, should also be covered by the protection scope of the present invention.

The harmonic drive 3 further includes a flexspline pressing member 35 and a bearing inner ring 36 that are used to connect with the flex spline 34 and transmit the torque output of the flex spline 34. The flexspline pressing member 35 is a T-shaped truncated cone structure and includes a position limiting portion 351 and a protruding portion. The position limiting portion 351 is a ring structure and the protruding portion 352 is cylindrical. The flex spline 34 defines a first through hole 341 in its bottom, and the first through hole 341 is located at the central axis of the flex spline 34. The bearing inner ring 36 defines a second through hole 361. The protruding portion 352 of the flexspline pressing member 35 passes through the first through hole 41 and the second through hole 361 in sequence. The flex spline 34 is arranged between the position limiting portion 351 of flexspline pressing member 35 and the bearing inner ring 36, fixing the flexspline pressing member 35 and the bearing inner ring 36 to the flex spline 34. When rotating, the flex spline 34 can drive the flexspline pressing member 35 and bearing inner ring 36 to simultaneously rotate about its central axis.

The outer casing 5 defines an opening in an end away from the electric motor 2. The output member 37 is located at the opening of the outer casing 5. The output member 37, the bearing inner ring 36, the flex spline 34 and the flexspline pressing member 35 are fixed together. Specifically, a number of threaded holds are defined in the corresponding positions of the output member 37, the bearing inner ring 36, the flex spline 34 and the flexspline pressing member 35. The threaded holes are respectively arranged in a circular array in the surfaces of the output member 37, the bearing inner ring 36, the flex spline 34 and the flexspline pressing member 35. The output member 37, the bearing inner ring 36, the flex spline 34 and the flexspline pressing member 35 are fixed by a number of screws that pass through the threaded holes therein. In the present embodiment, the output member 37 is a drive disc. In other embodiments, the output member 37 may be structures, such as a drive shaft.

A first bearing 391 is arranged between the outer casing 5 and the output member 37. The peripheral of the bearing inner ring 36 is partly embedded in an inner ring of the first bearing 391 to guarantee the rotation accuracy of the flex spline 34 and the output member 37.

In the present embodiment, the second gear 31 is a hollow T shaped gear and includes a gear portion 311 and an extending shaft 312. The gear portion 311 includes on its exterior outer teeth that engage with the first gear 21. The gear portion 311 includes therein a second bearing 392 supported between the gear portion 311 and the outer casing 5. The gear portion 311 and the wave generator 32 are fixed together through screws, and the wave generator 32 is sleeved on the extending shaft 312. A third bearing 393 is arranged between a periphery of an end of the extending shaft 312 that is away from the gear portion 311 and an inside surface of the position limiting portion 351 of flexspline pressing member 35. The rotation accuracy of the second gear 31 and the wave generator 32 is guaranteed by the second bearing 392.

The flexspline pressing member 35 defines a third through hole 353 in a center thereof. The post 6 pass through the second gear 31, the third through hole 353 and the output member 37 in sequence. One end of the post 6 is arranged in a center of the output member 37. A fourth bearing 394 is arranged on a periphery of the post 6 and supported between the post 6 and the outer casing 5. The output member 37 defines a fourth through hole in its center, and the post 6 includes a threaded portion at its lower portion. The threaded portion pass through the fourth through hole and a nut is provided for engaging with the threaded portion.

In the present embodiment, the sensor is an encoder 4 that includes an encoder circuit board 41 and a magnet 42. The magnet 42 is arranged at one end of the post 6 away from the output member 37. The encoder circuit board 41 is fixed to the outer casing 5 and faces the magnet 42. The encoder circuit 41 can detect accurately the actual motion data of the output member 37 by detecting the change of magnetic field of the magnet 42 at the center of the post 6. Encoder circuit boards can detect data of 16 bits, which means that the minimum detection angle is: 360/65536=0.0055 degrees=0.33 arcmin. The backlash and the angular transmission accuracy can thus be 0.33 arcmin.

In the present embodiment, the outer casing 5 includes a first casing 51 and a second casing 52. A chamber for mounting the harmonic drive 3 is formed between the first casing 51 and the second casing 52. A first step groove 511 and a second step groove 521 are defined in positions where the first casing 51 and the second casing 52 join. The circular spline 33 is located in the first step groove 511 and a second step groove 521. The first step groove 511 and the second step groove 521 clamp the circular spline 33 therein to hold the circular spline 33 in position. The first casing 51 further includes a tube-shaped supporting portion 512 that is located in the chamber. The outer surface of tube-shaped supporting portion 512 is connected with the inner ring of the second bearing 392, and the inner surface of the tube-shaped supporting portion 512 is connected with the outer ring of the fourth bearing 394.

The first casing 51 defines a space in a side opposite to the chamber. The electric motor 2 and the circuit 1 are located in the space. A lid is arranged at the end of the space that is away from the chamber for closing.

In the servomotor of the present embodiment, the speed-reduction output to the electric motor 2 is conducted via the harmonic drive 3. The output member 37 of the harmonic drive 3 is provided with a post 6. The angular displacement of the output member 37 can be accurately detected by the sensor that is capable of detecting the rotational state of the post 6, thereby obtaining the deviation value between the angular displacement of the output member 37 and the angular displacement theoretically derived according to the initial motion planning. The deviation value is fed back to the control circuit board, and one or more motion planning is added. The rotational deviation caused by the motor output error and the reducer transmission error is then offset, thereby increasing angular transmission accuracy. When the existing harmonic drives are used, sensors are arranged at the end of the electric motor. In the case that the performance of the electric motor is constant, it needs to utilize harmonic drives with greater accuracy for increasing the output accuracy of the reducer. The present invention utilizes ordinary harmonic drives and controls the actual output accuracy of the harmonic drive by using the angular displacement detection value of the sensor. The cost of ordinary harmonic drives is about ¼ of the cost of the precise harmonic drives, which is much lower than the solution using the precise harmonic drives.

Embodiment 2

Figure 3:
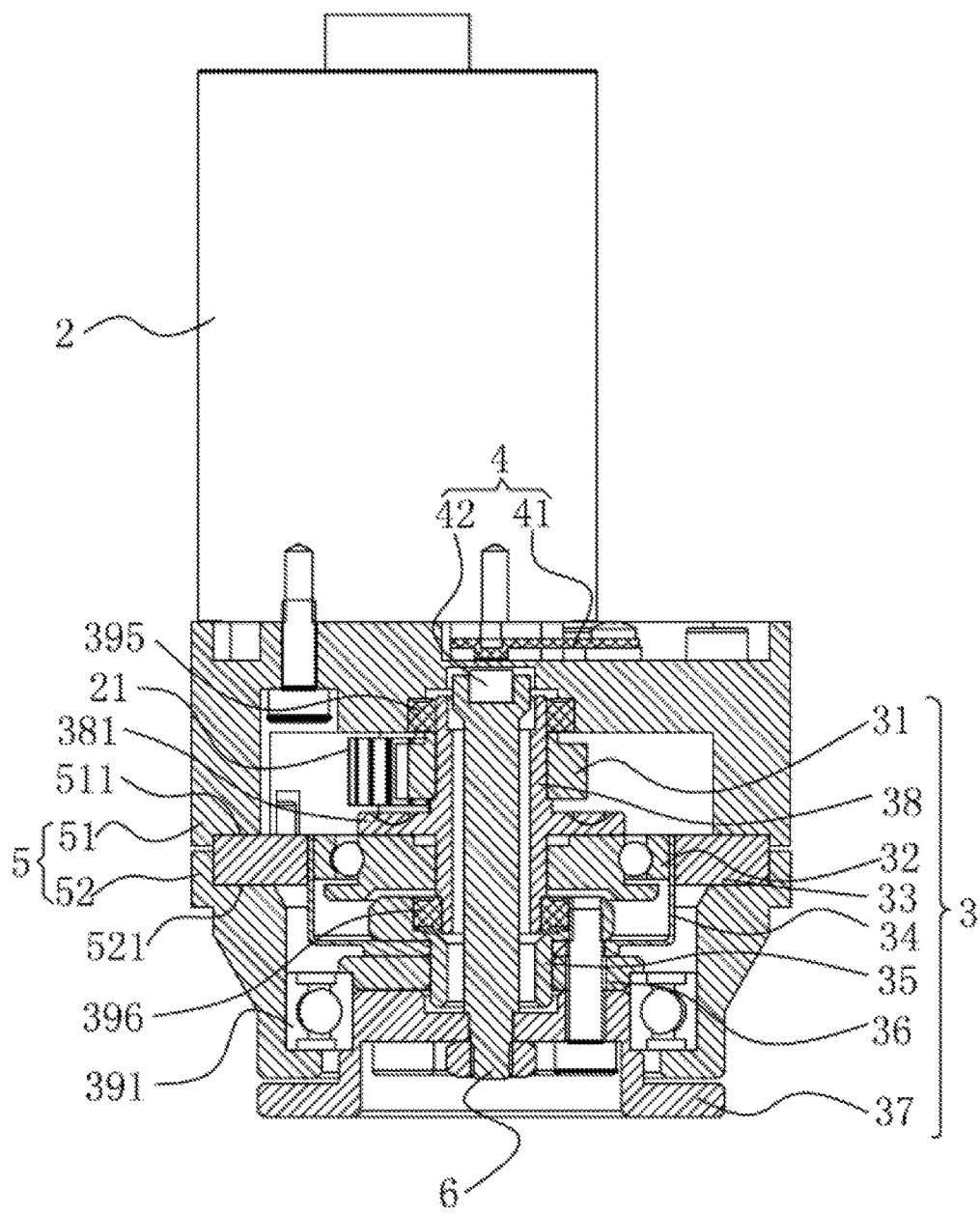
FIG. 3 is a cross-sectional view of a servomotor according to another embodiment.

As shown in FIG. 3, in the present embodiment, the servomotor includes most of the components of embodiment 1. The differences between them are described as follows.

In the present embodiment, a transmission shaft 38 is arranged along the central axis of the wave generator 32. The transmission shaft 38 includes a shoulder 381 that is connected to the wave generator 32 by screws. The second gear 31 is sleeved on the transmission shaft 38 by interference fit. The second gear 31 includes outer teeth that engage with the first gear 21. The transmission shaft 38 is hollow and the wave generator 32 is sleeved on the exterior of the transmission shaft 38. A fifth bearing 395 is arranged between one end of the transmission shaft 38 and the outer casing 5. A sixth bearing 396 is arranged between an opposite end of the transmission shaft (38) and the flexspline pressing member 35. The rotational accuracy of the second gear 31 and the wave generator 32 are guaranteed by the fifth bearing 395 and the sixth bearing 396.

The flexspline pressing member (35) defines a third through hole 353 in its center. The post 6 passes through the third through hole 353 and the transmission shaft 38 and is connected to the central axis of the output member 37. The output member 37 defines a fourth through hole in its center. The post 6 includes a threaded portion. The threaded portion passes through the fourth through hole and a nut is provided to engage with the threaded portion, thereby fixing the post 6 to the output member 37.

In the present embodiment, the outer casing 5 includes a first casing 51 and a second casing 52. A chamber for mounting the harmonic drive 3 is formed between the first casing 51 and the second casing 52. A first step groove 511 and a second step groove 521 are defined in positions where the first casing 51 and the second casing 52 join. The circular spline 33 is received in the first step groove 511 and the second step groove 521. The first step groove 511 and the second step groove 521 clamp the circular spline 33 therein to hold the circular spline 33 in position.

Embodiment 3

Figure 4:
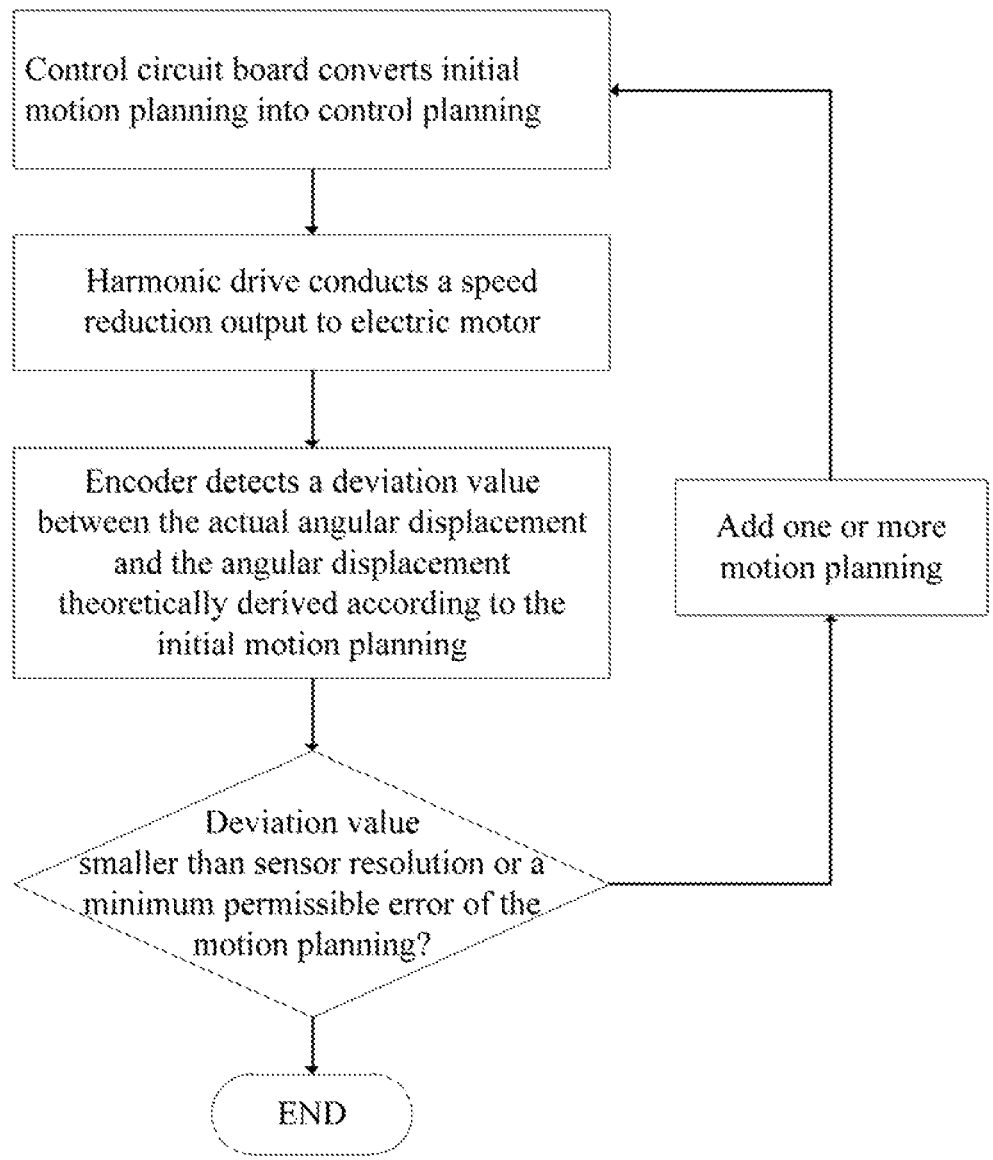
FIG. 4 is a flow chart of a method for controlling a servomotor according to yet another embodiment.

As shown in FIG. 4, in the present embodiment, a method for controlling a servomotor includes:

the control circuit 1 converting an initial motion planning into control planning and sending the control planning to the electric motor 2;

the electric motor 2 outputting angular displacement, rotational speed and torque according to the control planning, and the motor control can be realized by controlling the current inputted into the electric motor 2;

the harmonic drive 3 conducting a speed reduction output to the electric motor 2 and driving the post 6 to rotate;

the sensor detecting the angular displacement of the post 6, and calculating a deviation value between the angular displacement of the post 6 and the angular displacement theoretically derived according to the initial motion planning, adding one or more motion planning according to the deviation value and converting the one or more motion planning into control planning by the control circuit 1 and performing the control planning by the electric motor 2 until the deviation value is smaller than a resolution of the sensor or a minimum permissible error of the motion planning. In the embodiment, the magnetic encoder can serve as the sensor.

The angular displacement of the output member 37 can be derived by the sensor that directly detects the rotational motion data of the post 6. Since the post 6 is fixed to the output member 37, and no other arrangements that cause transmission errors exist between the post 6 and the output member 37, the rotational motion data detected by the sensor can directly reflect the actual motion of the output member 37.

The angular displacement theoretically derived according to the initial motion planning ignores the backlash and the angular transmission accuracy existed in the electric motor 2. The angular displacement that should be theoretically realized through the motion planning accords with the expected angular displacement that the motion planning expects.

In the embodiment, a spur gear reducer device is arranged between the electric motor 2 and the harmonic drive 3. After the first stage speed reduction by the spur gears, a second stage speed reduction is done by the harmonic drive 3. The above arrangement can further increase the transmission ratio, and the position of the electric motor can be adjusted by using gears of different sizes.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servomotor comprising:
   a control circuit, an electric motor, a drive and a sensor;
   the control circuit being electrically connected to the electric motor, and configured to output signals to control the electric motor to rotate;
   the drive comprising an outer casing, a wave generator, a flexspline and a circular spline that are arranged within the outer casing, the electric motor being arranged at one end of the outer casing, the wave generator being driven by the electric motor, the flexspline being sleeved on an exterior of the wave generator, the circular spline being fixed within the outer casing, the flexspline being located within the circular spline and engaging with the circular spline;
   the flexspline being connected with an output member that is configured to output power, and a post arranged along a rotation axis of the output member and fixed to the output member; and
   the sensor being arranged within the outer casing and configured to detect angular displacement of the post;
   wherein the drive further comprises a flexspline pressing member and a bearing inner ring, the flexspline pressing member comprises a position limiting portion and a protruding portion, the flexspline defines a first through hole in a bottom thereof, the bearing inner ring defines a second through hole, the protruding portion of the flexspline pressing member passes through the first through hole and the second through hole in sequence, and the flexspline is arranged between the position limiting portion of the flexspline pressing member and the bearing inner ring.

2. The servomotor of claim 1, wherein an output shaft of the electric motor extends to an inside of the outer casing and comprises a first gear arranged thereto, the wave generator comprises a second gear arranged thereto, and the first gear engages with the second gear.

3. The servomotor of claim 1, wherein the outer casing defines an opening in an end away from the electric motor, the output member is located at the opening of the outer casing, and the output member, the bearing inner ring, the flexspline and the flexspline pressing member are fixed together.

4. The servomotor of claim 1, wherein a first bearing is arranged between the outer casing and the output member, and a peripheral of the bearing inner ring is embedded in an inner ring of the first bearing.

5. The servomotor of claim 1, wherein the sensor is an encoder, the encoder comprises an encoder circuit board and a magnet, the magnet is arranged at one end of the post away from the output member, and the encoder circuit board is fixed to the outer casing and faces the magnet.

6. The servomotor of claim 1, wherein the outer casing comprises a first casing and a second casing, a chamber for mounting the drive is formed between the first casing and the second casing, a first step groove and a second step groove are defined in positions where the first casing and the second casing join, and the circular spline is received in the first step groove and the second step groove.

7. The servomotor of claim 2, wherein the first gear and the second gear are spur gears, and a number of teeth of the first gear is less than a number of teeth of the second gear.

8. The servomotor of claim 2, wherein the second gear comprises a hollow gear portion and an extending shaft, the hollow gear portion comprises therein a second bearing supported between the hollow gear portion and the outer casing, the wave generator is sleeved on the extending shaft, and a third bearing is arranged between a periphery of an end of the extending shaft that is away from the hollow gear portion and an inside surface of the position limiting portion of the flexspline pressing member.

9. The servomotor of claim 8, wherein the flexspline pressing member defines a third through hole in a center thereof, the post pass through the second gear, the third through hole and the output member in sequence, one end of the post is arranged at a center of the output member, and a fourth bearing is arranged on a periphery of the post and supported between the post and the outer casing.

10. A servomotor comprising:
    an electric motor;
    an output member configured to output power;
    a drive comprising an outer casing, a wave generator, a flexspline and a circular spline that are arranged within the outer casing, the electric motor being arranged at one end of the outer casing, the wave generator being driven by the electric motor, the flexspline being sleeved on an exterior of the wave generator, the circular spline being fixed within the outer casing, the flexspline being located within the circular spline and engaging with the circular spline; the flexspline being connected with the output member;
    a post arranged along a rotation axis of the output member and fixed to the output member; and
    a sensor being arranged within the outer casing and configured to detect angular displacement of the post;
    wherein the drive further comprises a flexspline pressing member and a bearing inner ring, the flexspline pressing member comprises a position limiting portion and a protruding portion, the flexspline defines a first through hole in a bottom thereof, the bearing inner ring defines a second through hole, the protruding portion of the flexspline pressing member passes through the first through hole and the second through hole in sequence, and the flexspline is arranged between the position limiting portion of the flexspline pressing member and the bearing inner ring.

11. The servo of claim 10, wherein the outer casing defines an opening in an end away from the electric motor, the output member is located at the opening of the outer casing, and the output member, the bearing inner ring, the flexspline and the flexspline pressing member are fixed together.

12. The servo of claim 10, wherein an output shaft of the electric motor extends to an inside of the outer casing and comprises a first gear arranged thereto, the wave generator comprises a second gear arranged thereto, and the first gear engages with the second gear; and wherein the second gear comprises a hollow gear portion and an extending shaft, the hollow gear portion comprises therein a second bearing supported between the hollow gear portion and the outer casing, the wave generator is sleeved on the extending shaft, and a third bearing is arranged between a periphery of an end of the extending shaft that is away from the hollow gear portion and an inside surface of the position limiting portion of the flexspline pressing member.

13. The servomotor of claim 12, wherein the flexspline pressing member defines a third through hole in a center thereof, the post pass through the second gear, the third through hole and the output member in sequence, one end of the post is arranged at a center of the output member, and a fourth bearing is arranged on a periphery of the post and supported between the post and the outer casing.

* * * * *